United States Patent [19]

Brigida et al.

[11] Patent Number: 5,313,051
[45] Date of Patent: May 17, 1994

[54] PAPERLESS PARCEL TRACKING SYSTEM

[75] Inventors: David J. Brigida; Marvin K. Brown, both of Boca Raton; Francis Fado, Highland Beach; Victor S. Moore, Delray Beach; Thomas K. Pate, Boca Raton; James J. Tout, Jr., Boca Raton, all of Fla.; Patrick F. Camilleri, Minneapolis, Minn.; Robert L. Donaldson; Michael N. Gray, both of Annapolis,, Md.

[73] Assignee: International Business Machines Corp., Armonk, N.Y.

[21] Appl. No.: 863,988

[22] Filed: Apr. 6, 1992

[51] Int. Cl.5 .............................................. G06F 15/20
[52] U.S. Cl. .................................... 235/375; 235/384; 345/173; 345/179
[58] Field of Search ..................... 235/375, 376, 384; 340/712; 178/18, 19; 382/3

[56] References Cited

U.S. PATENT DOCUMENTS

| 4,850,009 | 7/1989 | Zook et al. | 235/375 |
| 4,916,441 | 4/1990 | Gombrich | 340/712 |
| 5,006,699 | 4/1991 | Felkner et al. | 235/375 |
| 5,107,541 | 4/1992 | Hilton | 382/3 |
| 5,123,064 | 6/1992 | Hacker et al. | 178/18 |
| 5,195,133 | 3/1993 | Kapp et al. | 382/3 |
| 5,208,446 | 5/1993 | Martinez | 235/381 |
| 5,218,187 | 6/1993 | Koenick et al. | 235/472 |
| 5,222,138 | 6/1993 | Balaben et al. | 382/3 |
| 5,223,677 | 6/1993 | Kapp et al. | 178/18 |
| 5,231,381 | 7/1993 | Duwaer | 340/712 |

Primary Examiner—E. Rollins Cross
Assistant Examiner—Erick Solis
Attorney, Agent, or Firm—Romualdas Strimaitis

[57] ABSTRACT

A portable paperless parcel tracking system capable of reading bar codes on packages, capturing signatures and alphanumeric data related to the parcels when entered into a touch panel display, disabling manual or finger touch entry when a stylus is near the surface of the display, storing the parcel related data electronically and transmitting the data to a host at a convenient time.

13 Claims, 10 Drawing Sheets

Figure 10

PAPERLESS PARCEL TRACKING SYSTEM

BACKGROUND OF THE INVENTION

1. Technical Field

This invention is related to parcel delivery systems. In particular, this invention relates to paperless parcel delivery systems with computerized tracking of parcels and electronic signature capture and storage.

2. Background Art

Historically, businesses have had the necessary task of delivering parcels (i.e., goods and/or documents) to their customers. The need for keeping records of when and to whom the parcels were delivered necessitated the generation of paper documents to record each transaction. Large commercial enterprises such as retail chains, and even large governmental functions such as mail delivery (i.e., C.O.D., parcel post, or return receipt mail) can generate amounts of paper which are difficult and expensive to handle both in labor and storage costs.

More recently, third party parcel delivery firms have developed which provide delivery services on a global scale for millions of parcels daily. This requires the generation of large amounts of paperwork for tracking each parcel as it moves through the sender's organization, to each of the various components of the third party delivery firm, such as receiving station, sending location trucking department, freighter or aircraft shipping, receiving location trucking, and finally to the customer whose signature must be obtained, returned, and stored for proof of delivery.

Parcel tracking has been addressed in some areas, particularly in the area of parcel identification, by the development of bar codes and bar code scanners that allow identification of goods by machine. Bar code scanners are old and well known in the art. This approach is used in inventory checking systems, retail sales terminals, etc. However, while scanning systems provide an improved ability to identify appropriately marked goods, they do not address the problem of obtaining signature records to prove receipt of goods. Thus, the problems related to paper handling and storage remain, due to the requirement for signature records.

In the field of computer systems enabled with handwriting recognition capabilities, it is known how to fabricate and use small hand held computer systems with stylus inputs rather than conventional keyboards. The stylus inputs recognize hand writing and convert it into equivalent ASCII text. For example, the word "DIR" could be written on the screen with a stylus to convey information to a computer in like manner as a keyboard. Such systems also interpret stylus gestures. For example, writing a check mark over another character could mean "delete the character".

While handwriting recognition by computers is known, prior art systems have focussed on systems different from the invention herein both in concept and usage. For example, the prior art teaches how to digitize stylus movements, and how to analyze signatures to convert hand writing into ascii data. They do not teach collection of signature data in combination with other ASCII data to eliminate paper records as suggested by the invention disclosed herein. Further, prior art attempts have failed to provide the ability to detect the difference between contact with the touch panel display screen by the stylus and contact by another object such as a finger and automatically select the appropriate input. This creates a problem when a user inadvertently touches the screen of a hand held computer with a hand while simultaneously writing on the screen.

In addition, there is an another problem related to parcel tracking due to the time delay in updating records in a central record keeping facility caused by the turnaround time required to send the signature receipt back to the central record keeping facility and then to update the record database. Further, mishandling of the paper receipt may cause the central database to be incorrectly updated or not to be updated at all. In the event of a misdirected or lost parcel, the time delay in locating the parcel which is associated with paper record handling may impair the ultimate usefulness of the parcel to the customer.

As shown, the prior art has failed to provide for control of parcel delivery in a manner which is low in labor and storage costs, reduces the time required to update information in a central record keeping facility, and avoids problems caused by lost receipts. Further the prior art has failed to provide for problems related to the small size of hand held computers, such as when a stylus and hand both contact the input panel at the same time.

SUMMARY OF THE INVENTION

The system identifies parcels by a new and improved method of reading bar codes on parcels, providing key entry of data, capturing signatures on a touch panel display, and providing electronic transmission of all parcel related data to a host system without need for paper records.

DESCRIPTION OF THE PREFERRED EMBODIMENT

Figure 1:
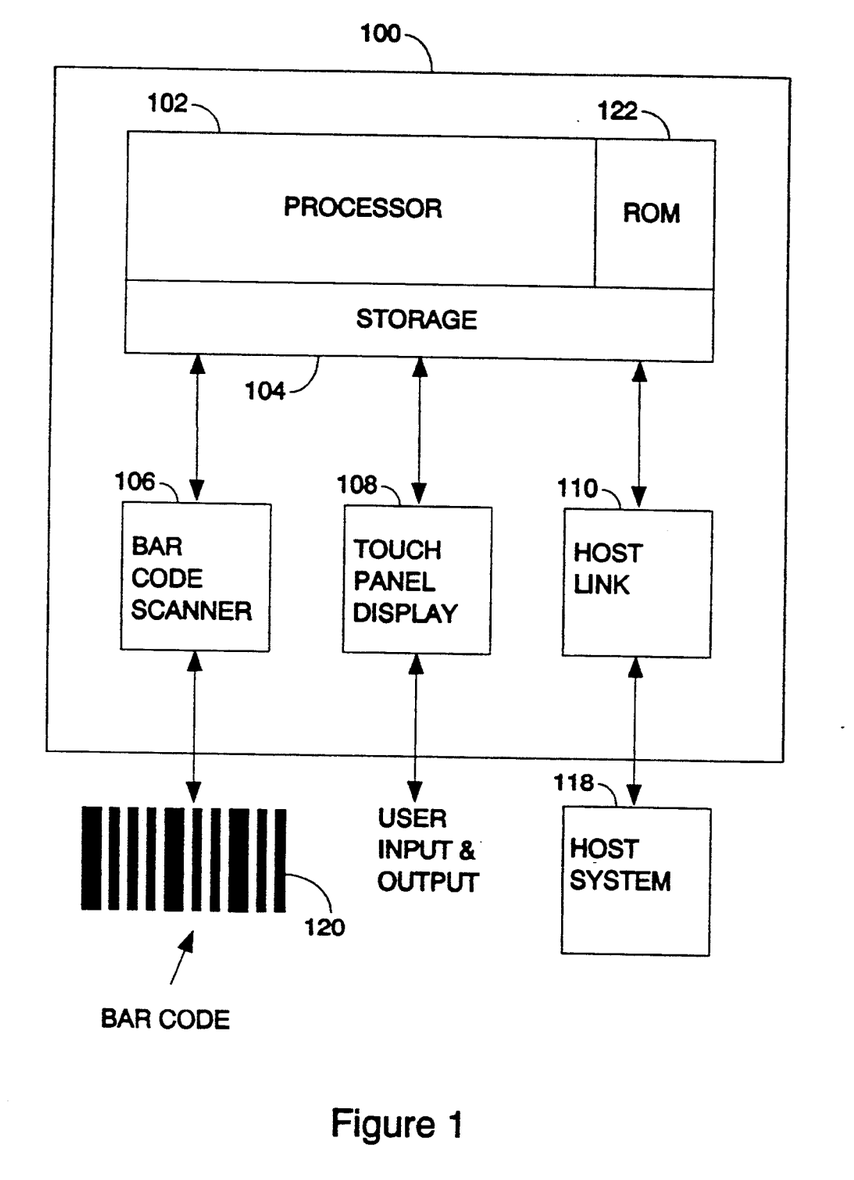
FIG. 1 is a block diagram showing the major system components and their interfaces.

In FIG. 1, a general overview of the major components used in the parcel tracking system 100 is shown.

The system software which resides in storage 104 and Read Only Memory (ROM) 122 is used by the processor 102 to control the operation of the various devices. The system software includes both the software that resides in ROM 122 and the software that is in storage 104. In ROM 122, the software includes BIOS, bar code algorithms, communication code, and power on self test (POST) diagnostics. Among the many functions performed by BIOS is power management. Bios routines within the computer's memory supervise and execute power management. The simplest task is to turn power on. This is achieved by assigning a small area of the touch screen to mean "power on". Touching this area with the power turned off causes the power to be turned on. Other techniques include inactivity timers to turn the screens back light off, and to lower the computers clock to conserve power. The type of software routine typified by the above noted software is well known to those skilled in the art. While there is no reason that ROM 122 is required for this category of software, ROM 122 is the preferred location for this type of standard application because by their nature, this code will not vary with the application the system is put to. While code that does not need to be changed is appropriate for ROM 122, the code that is custom designed for a particular application or is likely to change from time to time is most appropriately stored in storage 104 since the contents of storage 104 are more easily updated.

The parcel tracking system 100 does not require hard disk storage, floppy disks, PCMCIA cards, or other removable media to retain the code stored in storage 104. The requirement for disk storage is eliminated by using BIOS routines residing in ROM 122 to download the system software from the host system 118 with the host link 110 into storage 104. This eliminates the need for an expensive I/O subsystem and reduces the size and weight of the parcel tracking system 100. After downloading, the object code is executed in the same manner as code loaded from disk storage in a typical prior art approach.

The host link 110 uses infrared circuitry to transfer information into and out of the system. Infrared is used because it eliminates the problems associated with connectors, such as contact resistance, failures from bent or broken pins, alignment, etc. The infrared circuitry is connected to the internal serial port of the system. The infrared baud rate is programmable. The host link 110 utilizes a baud rate of 19.2 KB/SEC, and runs in the half duplex mode of operation, but those skilled in the art will recognize that these parameters can easily be changed to suit the needs of the particular operation.

The types of software routines which would be downloaded from the host 118 via host link 110 would be device drivers such as the touch panel control software which would contain the screen formats for the particular user application, the bar code scanner code, stylus code, and the programming interfaces, etc. Examples of system code which would be downloaded would be code such as an operating system which would control the overall operation of the system. An example of a suitable operating system is the well known commercially available product sold by IBM Corporation, DOS 5.0. By limiting the amount of code that is fixed in ROM 122 and maximizing the amount of code that is stored in storage 104, the flexibility of the parcel tracking system 100 is enhanced by increasing the ease in which new features and functions can be added to the system as they become available or are required.

The host link 110 can be implemented in a variety of ways, including infrared link, cellular or radio transmission, conventional electrical contacts, or the like. The advantage of an infrared data link, cellular or radio is that they allow the device to be packaged such that it is more water resistant. Since the parcel delivery system will often be used outdoors, it is advantageous to avoid a data transfer mechanism which may be degraded by the presence of moisture (e.g., metal contacts). However, those skilled in the art will recognize that a variety of alternatives can be substituted. For example, the host link 110 could use direct metal contacts (with care to ensure they are dry before use) for electrical data transfer. Likewise, an internal modem could be used for data transmission to the host system 118.

The host link 110 uses a docking station 902 (shown in FIG. 9) which would function as a temporary host 118 or function as an infrared I/O device attached to a host such as a Personal computer, mainframe, etc.. The parcel tracking system 100 could be docked in the docking station 902 after each parcel delivery for transfer of the parcel data to temporary storage while the user was enroute to the next delivery. After a suitable number of deliveries are made, or at the end of a predetermined period of time, whichever is most convenient, a batch transfer of multiple parcel data can be made from the docking station 902 to the host 118. With the addition of temporary storage capability to the docking station, the storage of multiple parcel data on conventional magnetic or optical storage devices for later input to the host system 118 can also be performed by the docking station 902. In addition, the docking station 902 can provide contacts for charging of a rechargeable battery in the parcel tracking system 100. Those skilled in the art will recognize that portable docking stations 902 could be designed to accommodate a plurality of parcel tracking systems.

Figure 9:
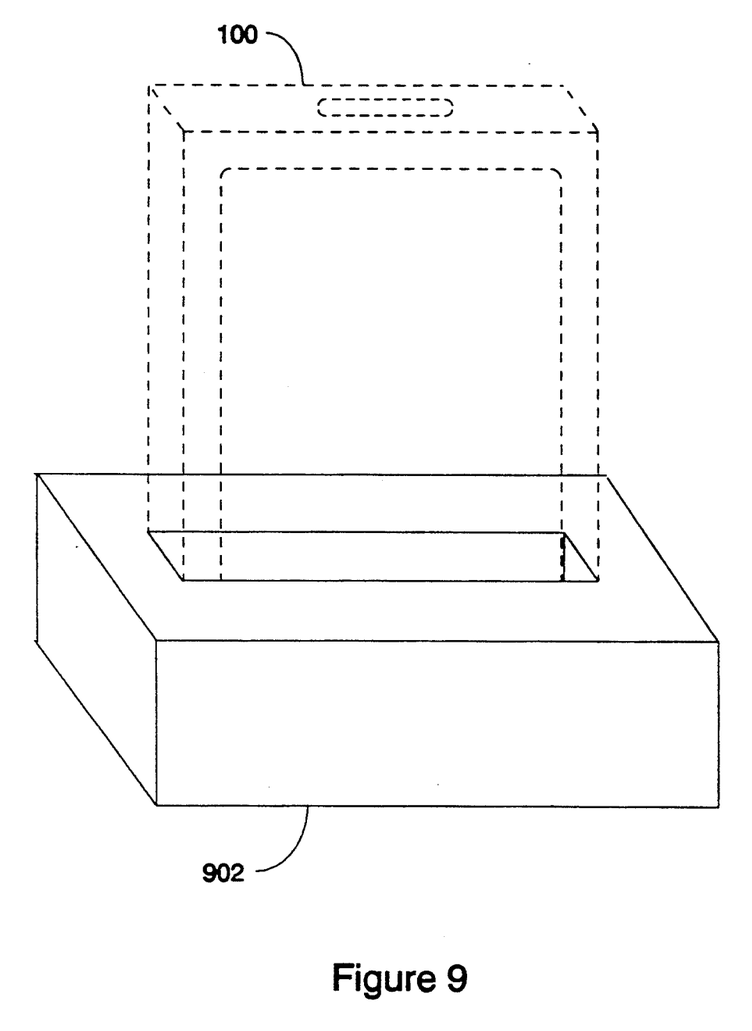
FIG. 9 shows the docking station with an docked parcel tracking system.

As stated above, the host link 110 can use a cellular modem, or radio in place of the infrared link. The use of a cellular modem or radio allows direct transfer from the parcel tracking system 100 to the host system 118 without using the docking station 902.

The touch panel display 108 (hereinafter the display) in the preferred embodiment is an LCD display panel or tablet display of the type well known in the art. In addition, the display 108 is equipped with a touch sensitive overlay (shown below in FIG. 7) for capturing data entered either from a finger touch or from a stylus 202. Specifically, the display 108 is sensitive to both stylus 202 and finger touch. This means the stylus 202 can draw on the display 108 or a finger can touch the display 108 to select options displayed in selected predetermined fields of the display 108.

One difficulty associated with designing a small hand held computer which has both finger touch and stylus touch capability is the possible confusion which may result when a finger or portion of one hand comes in contact with a display while attempting to write on the display with the stylus.

Figure 7:
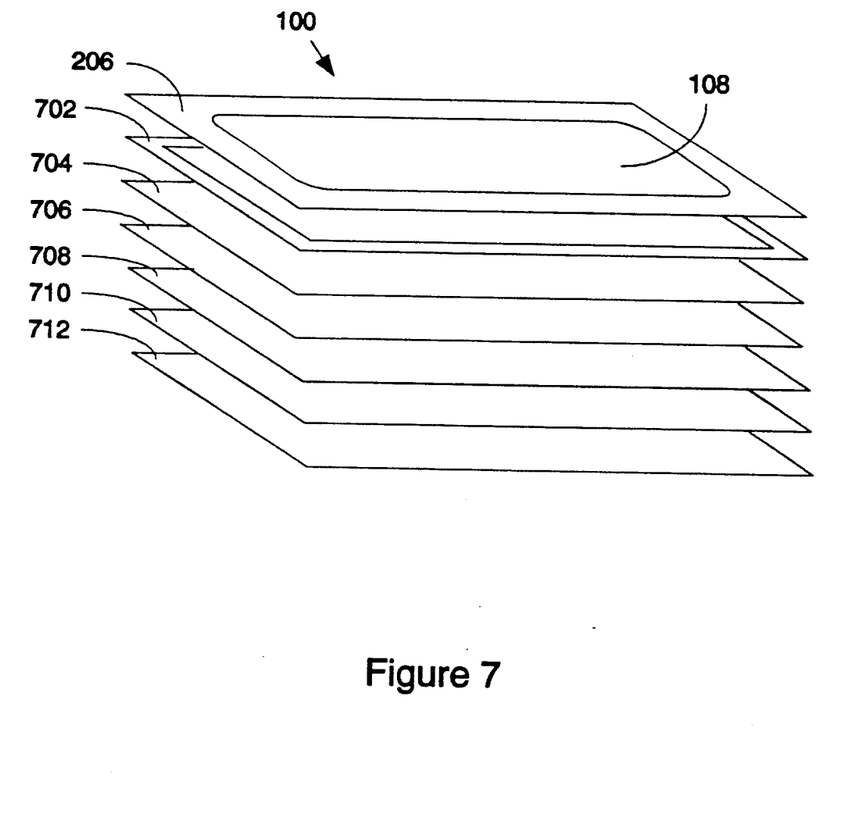
FIG. 7 shows the internal arrangement of components within the parcel tracking system.

An advantage of the invention is the ability not only to detect the difference between finger touch and contact by the stylus 202 with the display 108, but also to detect when the stylus 202 is in close proximity to the display without actually being in contact with it. When engaged concurrently, the stylus 202 takes precedence over touch. This allows the hand to rest on the display 108 while the other hand is drawing on the display 108 with the stylus 202. To accomplish this task, the bezel 206 (shown in FIG. 2) which surrounds the display 108 incorporates a ring antenna 702 used in conjunction with the stylus 202 to measure the proximity of the stylus 202 to the display 108. When the stylus 202 approaches the display 108, the display 108 senses stylus 202 and turns the finger touch logic off. The finger touch logic remains off until the stylus 202 is removed from the vicinity of the display 108. The stylus 202 and ring antenna mechanism are discussed in more detail below, in relation to FIG. 8.

The processor 102 can format the display 108 such that a variety of fields having control information are presented. For example, one field on the display 108 could be a command instructing the processor 102 to display an alphanumeric keyboard for entry of customer data such as the name of the person receiving the parcel.

Another field could be a command instructing the processor to prepare a predetermined area of the screen to capture signature data entered by a stylus. Completion of the signature would be indicated to the system either by timeout after completion of data entry into the field or preferably by selecting a command displayed in a predetermined field of the display 108. The actual configuration of the control fields will vary depending on the requirements of the particular application and customer set. Those skilled in the art will recognize that while the screen format could be accomplished in a variety of ways, including hardware or programmable read only memories, the use of software stored in storage 104 and ROM 122 and executed by the processor 102 will typically be the most desirable method of display control.

The bar code scanner 106 reads a bar code 120 affixed to a package (not shown) under control of the processor 102. Bar code laser scanners are well known in the art. The information read from the bar code 120 is stored in storage 104 under control of the processor 102. Activation of the scanning process can be accomplished in a variety of ways. For example, it can be automatically started when the customer information is entered into the touch panel display 108. It can automatically start when alphanumeric data is entered into the display 108. Additionally, a command field can be displayed at a predetermined location on the display 108 which would allow the user to activate the scanning process.

At the completion of a parcel delivery, all of the parcel information normally stored on paper, such as information related to parcel identification, information related to where and to whom the parcel was delivered, and the electronically captured signature of the receiving party, will be stored in storage 104. At the appropriate time, this information can be transferred to an external host system 118 by the host link 110. Those skilled in the art will recognize that the external host 118 can be any one of a number of commonly available processors, such as a mainframe, a minicomputer, a personal computer, or the like. The type and size of the host will be governed by the needs of the particular business using the parcel tracking system 100.

Figure 2:
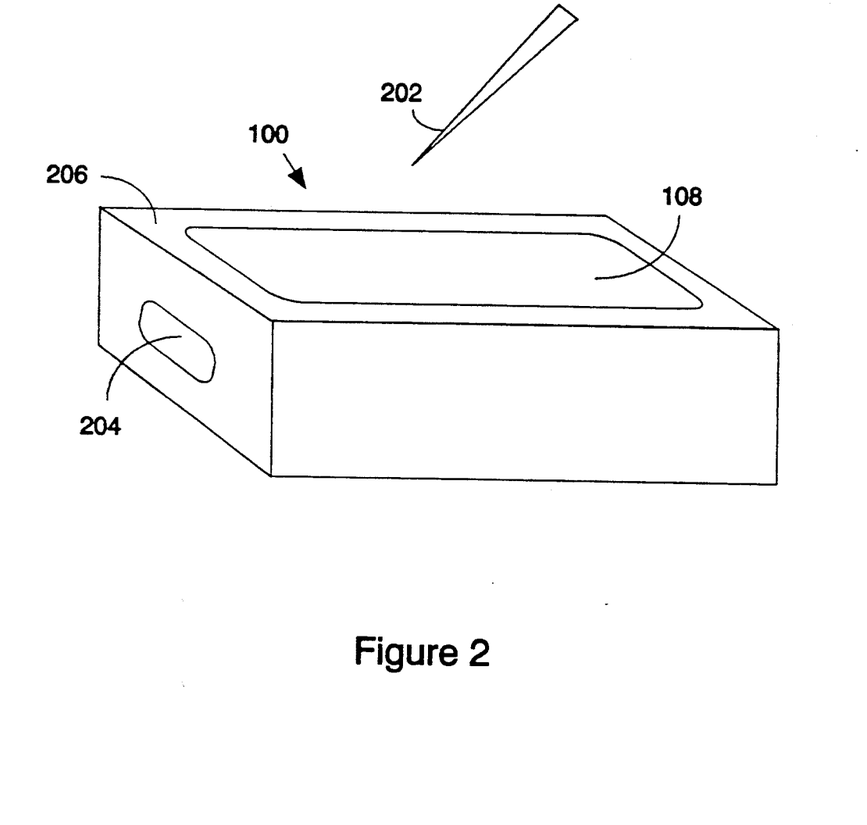
FIG. 2 shows the external configuration of system components including the touch panel display, the scanner output window, and a separate stylus.
Figure 3:
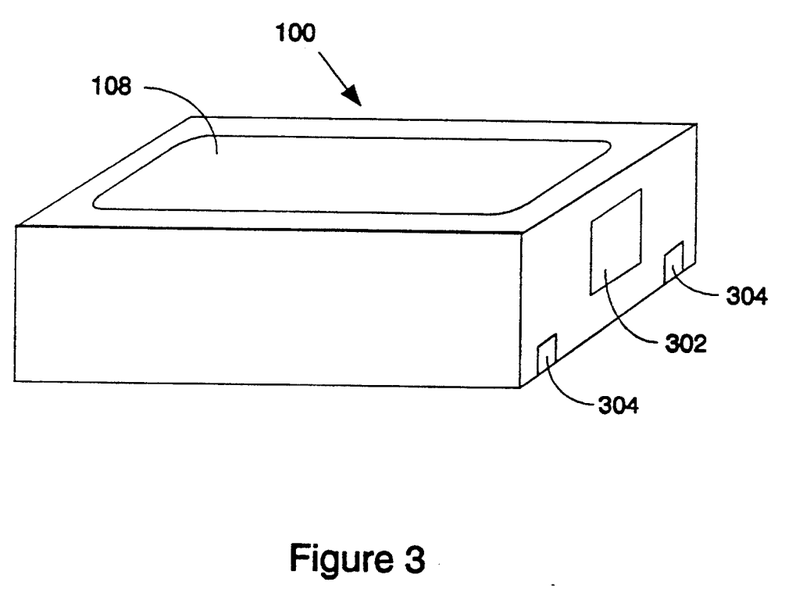
FIG. 3 shows a second view of the external configuration of system components including the touch panel display and the host link.
Figure 4:
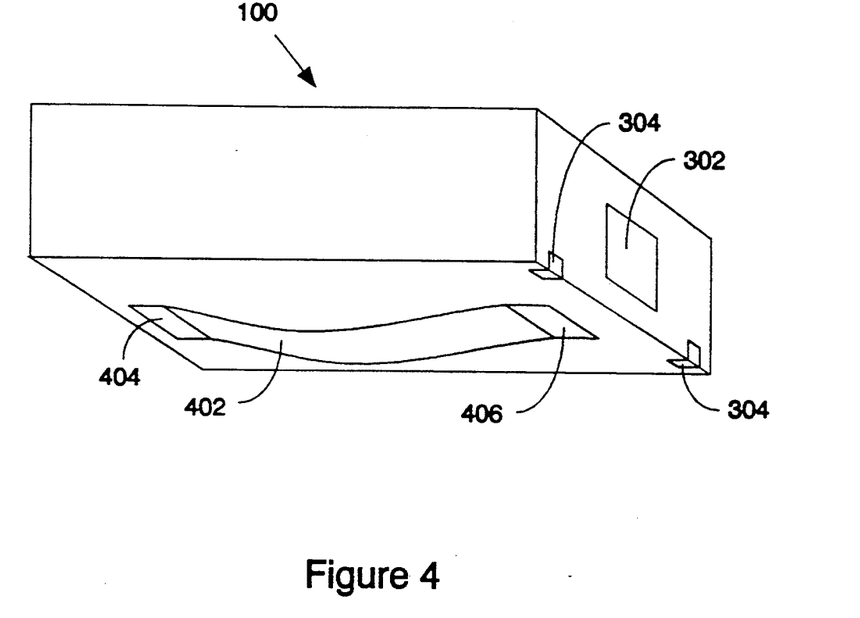
FIG. 4 shows a third view of the external configuration of system components the host link and the holding strap on the bottom of the system.

FIGS. 2-4 show the physical configuration of the system. It will be understood by those skilled in the art that while the parcel tracking system 100 was drawn in the shape of a rectangular box for ease of illustration, the external packaging of the system would in practice be configured such that it would comfortably fit in the hand of a user (i.e., rounded edges, etc.).

In FIG. 2, the top surface shows the touch panel display 108 surrounded by the bezel 206. and the side panel shows the bar code scanner window 204. Placement of the bar code scanner window 204 on the front end side of the parcel tracking system 100, as shown, allows the user to aim the bar code scanner 106 at a bar code 120 in a convenient manner.

FIG. 3 is a perspective view which shows the rear end side of the parcel tracking system 100 from that shown in FIG. 2. The window 302 at this end of the parcel tacking system 100 allows the host link 110 to communicate with the host 118. Optional battery recharge contacts 304 are shown along the edge of the parcel tracking system 100. The preferred embodiment separates the bar code scanner 106 from the host link 110 to facilitate ease of packaging, resulting in the bar code scanner window 204 being located at the opposite end of the host link window 302. However, those skilled in the art will recognize that placement of the windows 204 and 302 or battery contacts 304 can be done in any manner deemed convenient.

FIG. 4 shows a bottom perspective view of the parcel tracking system 100. A strap 402 is attached to the bottom of the parcel tracking system 100 at ends 404 and 406. The strap 402 can be mechanically attached by any method deemed suitable. The function of the strap is to avoid accidental dropping of the parcel tracking system 100 and to provide a convenient way to hold the parcel tracking system 100 with one hand by allowing the user to slide one hand between the strap 402 and the parcel tracking system 100.

Figure 5:
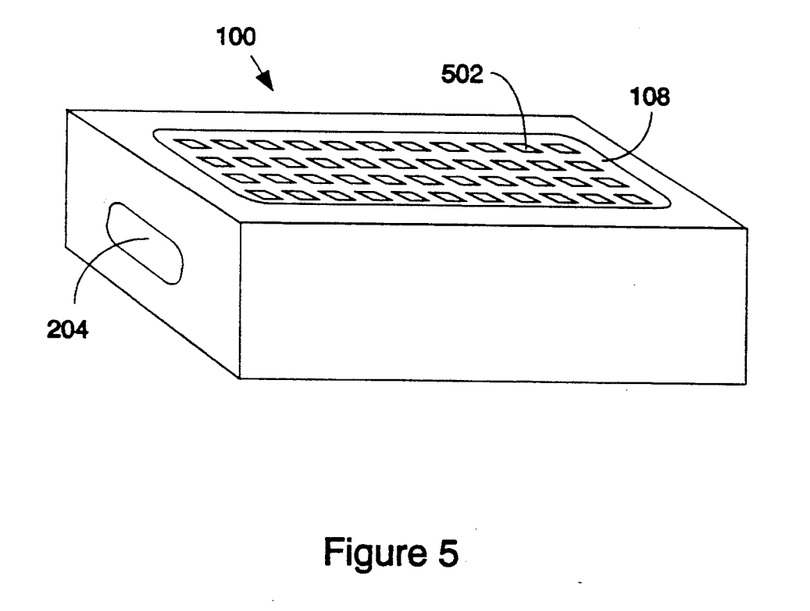
FIG. 5 shows the touch panel display with an alphanumeric keyboard on the display screen.

FIG. 5 shows the display 108 configured in the form of an alphanumeric keyboard. Each keypad 502 is displayed on display 108 at the most convenient location for the application in use.

Figure 6:
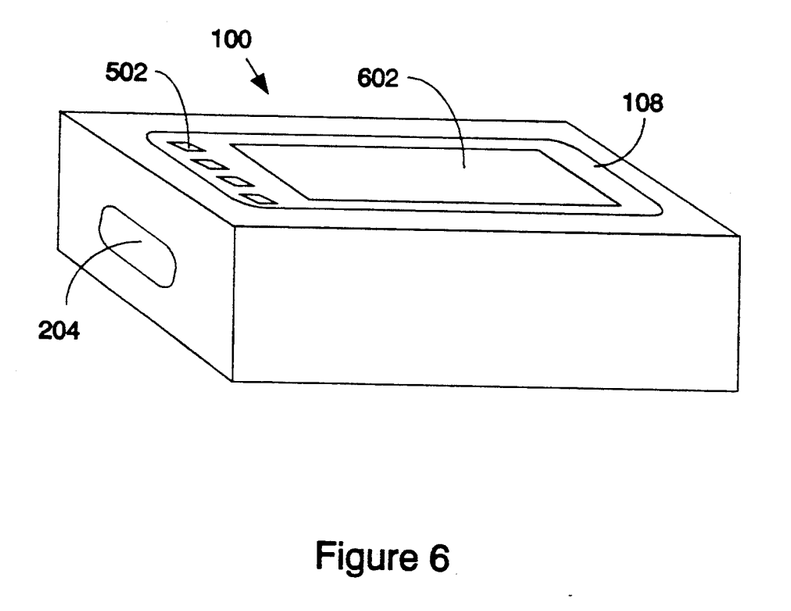
FIG. 6 shows the touch panel display with a signature field and several command keypads displayed.

FIG. 6 shows the display 108 configured with several keypads 502 at one side of the display and a large area defined as a signature entry field 602. Those skilled in the art will recognize that the signature field 602 can be located at any location on the screen and the number of keypads 502 will vary with the particular application in use.

FIG. 7 shows the physical arrangement of the various major subassemblies in the preferred embodiment of the parcel tracking system 100. The top cover is comprised of bezel 206. The ring antenna assembly 702 which is used to sense the presence of the stylus 202 is fit within the bezel 206 in the preferred embodiment. A touch overlay assembly 704 is located such that it covers the opening in the bezel 206. The LCD display assembly 706 is located below the touch overlay assembly 704. Touch overlay assembly 704, LCD display assembly 706 and their associated circuitry comprise the touch panel display 108. The processor printed circuit board assembly 708, the touch detection circuitry and bar code scanner circuitry are located on scanner/touch panel assembly 710 for convenience, and the batteries are located on power board 712.

Figure 8:
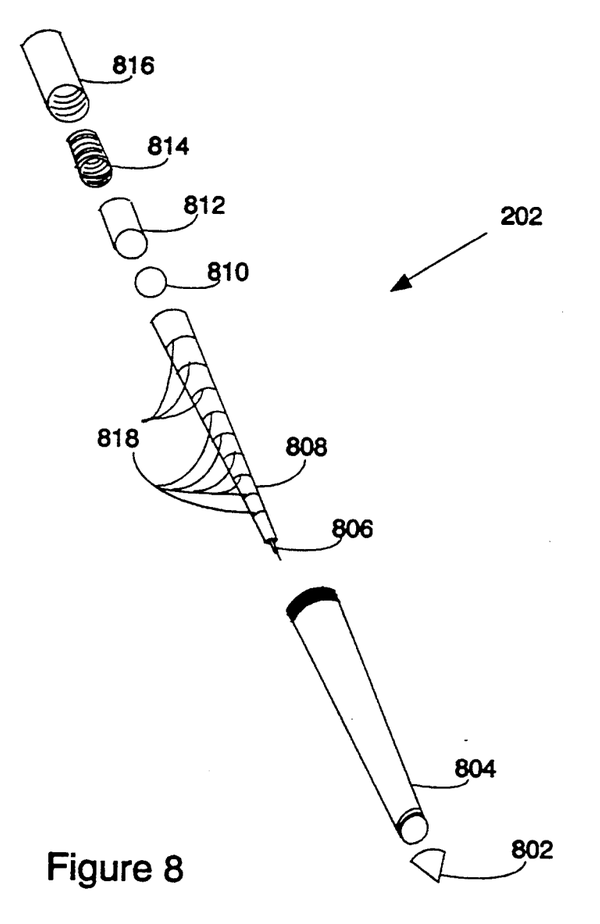
FIG. 8 shows an exploded view of the stylus.

FIG. 8 shows an exploded view of the stylus 202. The stylus 202 is untethered and is a intelligent device. The stylus 202 consists of antennas 806 and 818 which are used to transmit and receive data, a stylus printed circuit board assembly 808 to process the data, and a battery 812 to provide power to the stylus 202. The casing for the stylus consists of a tip 802, a barrel sleeve 804 and a cap 816. In addition, an O-Ring 810 is used to seat the battery 812 against the stylus printed circuit board assembly 808, and a spring 814 is used to hold the battery 812 in pressure contact with its electrical connections. The cap 816, barrel sleeve 804 and tip 802 have threaded ends to facilitate replacement of the battery 812.

Antenna 806 is mounted very close to the tip 802 of the stylus 202. Antenna 806 responds to information on the touch overlay assembly 704 of the touch panel display 108 and presents this information to the stylus printed circuit board assembly 808 for processing. After the stylus printed circuit board 808 has processed the information, it sends the results to the antenna 818 via a voltage controlled oscillator (VCO) on the stylus printed circuit board assembly 808 for transmission back to the parcel tracking system 100. Antenna 818 is a ferrite core covered by winding. The information transmitted by antenna 818 is received by ring antenna assembly 702 mounted in the front bezel 206 and is then forwarded to the scanner/touch panel assembly 710.

Stylus 202 also has a proximity detector that will determine that the stylus 202 is within a predetermined distance to the parcel tracking system 100, typically about two inches. The stylus 202 will transmit a code to the parcel tracking system 100 which will indicate that the stylus 202 is in proximity to the parcel tracking system 100 and that finger touch input should be turned off. This allows hand rejection when the stylus 202 is in use. The stylus 202 also has a "Touch Detect" capability which is programmable and allows the system to set the parameters that determine when the stylus 202 will "ink" the touch panel display 108. This is a very important feature in a system which captures hand written information.

A more detailed description of mechanism used to exclude finger touch when the stylus is present follows.

When using the stylus 202 to write on the touch overlay assembly 704, the user may rest his writing hand on the touch overlay assembly 704. To prevent the users hand from being misinterpreted as an intentional finger touch, the system is designed to provide touch sense exclusion. Touch sense exclusion works by disabling the touch sense function when the stylus 202 is detected to be within a predetermined distance from the touch overlay assembly 704.

When the touch digitizer is in either "Active" or "Sleep" mode the touch overlay assembly 704 is alternately scanned for finger touch by performing a touch sense cycle, and stylus 202 presence by performing a stylus cycle. The digitizer program monitors the data generated by each cycle to determine which cycle to perform next.

Stylus Cycle

A stylus cycle is initiated when the ring antenna assembly 702 is driven with LOOPDRV at the same time the XYGA drives the touch overlay assembly 704 wires with TDCLK. LOOPDRV occurs one half of the 2XTDCLK cycle earlier than the rising edge of TDCLK. The stylus 202 tests for the presence of LOOPDRV at the coil around the ferrite core which receives the signal from the ring antenna assembly 702. The stylus 202 uses this signal to regenerate the a corresponding TDCLK signal. TDCLK is regenerated in the stylus 202 to synchronize the stylus 202 with the digitizer. The stylus 202 measures the signal on the touch overlay assembly 704 wires using a sensitive ball antenna at the stylus tip which is integrated during the TDCLK pulse durations. This value is digitized using an Analog to Digital converter in the stylus 202 and transmitted to the Digitizer as a serial data message. The data is converted to 400 KHz and 600 KHz signals The data is sent to the ring antenna assembly 702 of the digitizer by driving the stylus coil at the same time the digitizer switches the loop antenna to the input of an FSK (Frequency Shift Keying) receiver. Data is recovered by the quadrature detector circuit and read by the processor on the SDAT signal which is clock by SCLK. When the processor determines that the data is valid, the cycle is complete.

Exclusion Test

When the stylus cycle is completed the stylus 202 is within range to be tested. The data received is compared to a programmable threshold value. If the data received exceeds the threshold value the touch cycles are no longer issued by the processor which issues another stylus cycle. The process is continued as long as the data received remains above the sum of the threshold value and a hysteresis value. During this time the sense cycles are suspended and the system is in the touch sense exclusion mode. The system resumes normal dual mode when the touch sense exclusion mode is ended.

In FIG. 9, the docking station 902 is shown with a parcel tracking system 100 drawn in shadow form to illustrate the manner in which the parcel tracking system is placed in the docking station 902. The docking station 902 may be an intelligent terminal or may be an unintelligent I/O device attached to the host system 118 depending on the needs of the particular application.

Figure 10:
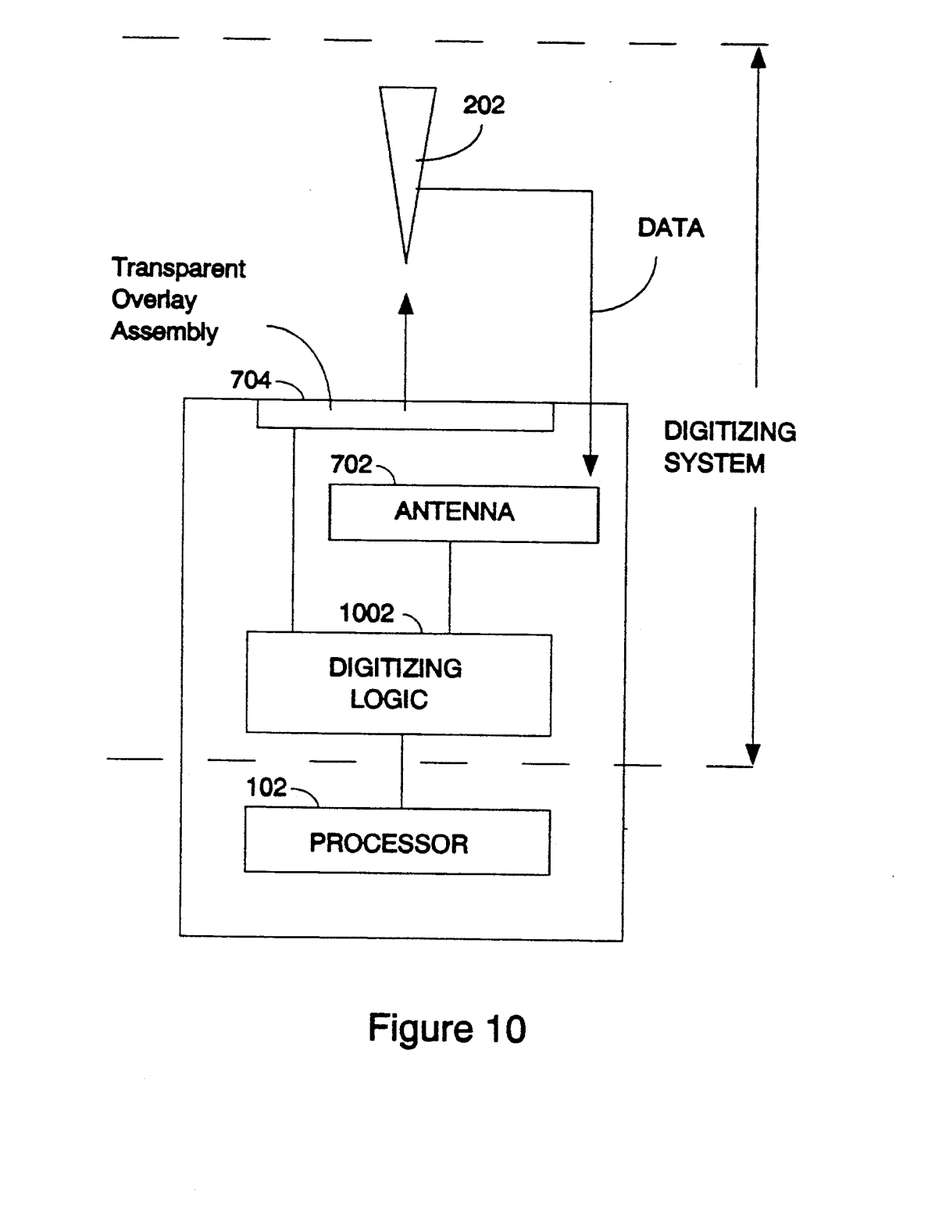
FIG. 10 shows a block diagram of the digitizing subsystem.

As shown in FIG. 10, both the finger touch sense and stylus sense operate using the same fundamental principals. For this reason, it is possible to use the same basic system hardware to accomplish both tasks. The advantage of this approach is that the cost and size of the system is optimized compared to a system which uses two separate approaches to finger touch sense and stylus sense.

Known systems which provide untethered stylus function require a wire grid to be located behind the display, which is usually a flat LCD. This approach causes the grid to be relatively far from the touch surface. It also requires the display to be flat and thin, or the grid would be too far from the touch surface to operate properly. If placed on the visible surface the wires would be visible.

The subject device uses a thin membrane assembly shown in FIG. 10 labeled touch overlay assembly 702. Touch overlay assembly 702 is designed to provide a 2 axis grid which does not severely detract from the visibility of the display. It is installed over the display surface. The transparent overlay is made from layers of polyester film coated with thin lines of ITO connected electrically, via silver ink bus wires printed on the margins of the overlay, to the digitizing logic 1002. Installing the overlay on the display surface means that the touch system is not affected by display thickness or signal transparency.

The stylus 202 position is detected by measuring the strength of a capacitively coupled signal from the transparent overlay 702. The ITO lines in the transparent overlay sequentially driven with a square wave signal. The signal induces a charge on a sensitive element on the stylus tip. The level of induced charge is proportional to the distance from the active line in the overlay. This value is measured and encoded by the stylus 202.

The value measured in the stylus is used to determine the position of the stylus 202 in three axis This method of measurement is made possible by the unique geometry of the transparent overlay and the stylus tip, which brings the two in close proximity when the stylus tip is on the overlay surface.

The digitizer circuits drive a square wave signal on each of the overlay bus wires sequentially. The bus wires are connected to the ITO lines in the overlay in a predetermined pattern.

The stylus measurements are mapped to the ITO lines in the transparent overlay which were active at the time the stylus measurement was taken. By comparing the relative signal levels represented in the measurements, to the position of the ITO lines in the overlay, the position of the stylus 202 is determined.

Once the position of the stylus 202 is determined, the absolute signal strength represented by the stylus measurements is compared to a programmable threshold value. The value is adjusted to represent the absolute value which, when adjusted for lateral distance from the ITO line, represents the expected value of the measurement when the stylus tip is on or near the touch overlay assembly 704 surface. When the value exceeds the adjusted threshold limit the contact position is determined.

Information must be transferred between the stylus 202 and the digitizer in order for the system to function. The communications must be low power to be practical in a small battery powered device, wireless to be used with an untethered stylus, and low cost.

The subject system uses a loop antenna located around the perimeter of the active digitizer area. The stylus contains a coil around a ferrite core located just behind the tip. Both of these devices are connected to a driver or a receiver circuit via analog switching devices, providing transmit and receive capability in both devices.

During the portion of an operation when the digitizer loop antenna is connected to the driver circuits a square wave signal is driven to the loop antenna. At the same time the coil in the stylus 202 is connected to the receiving circuits.

To further illustrate the advantages of the invention, an example of how the invention may be used is described below.

A driver in the parcel delivery business will typically pick up the parcel tracking system 100 from a stationary docking station 902 before the driver begins the days work of picking up and delivering parcels. The device will typically have the following information in storage:

Delivery route and stops
Records of deliveries and pickups to be made

During the work day, the driver will record parcel delivery and pickup information in the parcel tracking system 100. This information will be collected via the touch panel display 108, the stylus 202, and the bar code scanner 106. The information would consist of package IDs, signatures, COD information, destination for pickups, and timestamp information. The parcel tracking system 100 could also store information such as employee time card information, vehicle data, etc. This information could be transmitted real time to the host system 118 if a mobile docking station 902 in the vehicle has radio capability or if the parcel tracking system 10 is equipped with radio/cellular capability rather than an infrared host link 110. Alternatively, the information could be transferred in batch mode at the end of the day.

While the invention has been described in detail above, it will be understood by those skilled in the art that various changes in detail may be made therein without departing from the spirit, scope, and teaching of the invention. For example, the docking station can be modified to function as an intelligent system or as a dumb I/O terminal. The docking station can be located at the terminal or on the vehicle used for delivery. The laser bar code scanner could be replaced with a magnetic bar code reader. The infrared host link can be replaced with cellular or radio transmitters, etc. The software could be located entirely in ROM rather than being split for convenience between ROM and Storage. Accordingly, the invention herein disclosed is to be limited only as specified in the following claims.

We claim:

1. A paperless parcel tracking system which obtains signature and data information without paper records, comprising:

a processor for executing a parcel tracking program;
   storage for storing signature information and parcel descriptive information;
   a bar code reader for reading parcel descriptive information from a bar code related to at least one selected parcel into the storage under control of the processor;
   a stylus for entering information into the system;
   a touch sensitive tablet display for detecting signature information written by the stylus on the tablet display which signature information is related to the selected parcel descriptive information and store the signature information into the storage;
   means to display control information in predetermined fields of the tablet display;
   means to detect input from manual contact with the tablet display; and
   means to disable input from manual contact with the tablet display when the stylus is within a predetermined distance to the tablet display;
   whereby signatures related to the tracking of parcels are obtained without paper documentation.

2. A system, as in claim 1, wherein the bar code reader is a laser scanner.

3. A system, as in claim 1, wherein the bar code reader is a magnetic bar code reader.

4. A system, as in claim 1, wherein the bar code reader is controlled by selecting a control command displayed in one of the predetermined location of the display tablet.

5. A system, as in claim 1, wherein the bar code reader is automatically started when the signature data is entered.

6. A system, as in claim 1, wherein the display is an LCD display.

7. A paperless parcel tracking system which obtains signature and data information without paper records comprising:

a processor for executing a parcel tracking program;
   storage for storing signature information and parcel descriptive information;
   a bar code reader for reading parcel descriptive information from a bar code related to at least one selected parcel into the storage under control of the processor;
   a stylus for entering information into the system;
   a touch sensitive tablet display for detecting signature information written by the stylus on the tablet display which signature information is related to the selected parcel descriptive information and store the signature information into the storage;

means to detect when the stylus is within a predetermined distance from the tablet display;

means to disable touch input by manual contact with the tablet display while the stylus is within a predetermined distance of the tablet display surface; and host link means to output the selected parcel descriptive information and related signature information;

whereby signatures related to the tracking of parcels are obtained without paper documentation.

8. A paperless parcel tracking system, comprising:

a processor;

storage;

a bar code reader for reading parcel descriptive information from a bar code related to at least one selected parcel into the storage under control of the processor;

a touch sensitive LCD tablet display for detecting input from a stylus, further comprising:

means to display control commands on predetermined locations of the tablet display;

means to detect the presence of the stylus in one of the predetermined locations on the tablet display;

means to read signature information written on the tablet display which is related to the selected parcel descriptive information and store the signature information into the storage;

wherein the tablet display detects the stylus when it is within a predetermined distance from the tablet display surface and disables manual touch input while the stylus is within the predetermined distance from the tablet display surface; and an infrared link to output the selected parcel descriptive information and related signature information;

whereby signatures related to the tracking of parcels are obtained without paper documentation.

9. A system, as in claim 8, wherein operation of the bar code reader is controlled by selecting a control command displayed in a predetermined location of the tablet display with the stylus.

10. An intelligent touch sensitive tablet display, comprising:

a touch sensitive display screen capable of detecting input from a stylus and from manual touch;

a first antenna positioned substantially adjacent to the perimeter of the display screen;

an intelligent stylus having a second antenna;

first logic means for transmitting positional information from the first antenna to the stylus;

second logic means for processing positional information received from the first antenna, determining when the stylus is within a predetermined proximity to the touch sensitive display screen, and signalling the touch sensitive display screen that the stylus is within a predetermined distance to the touch sensitive display screen; and third logic means for processing the positional information transmitted from the stylus indicating that the stylus is within a predetermined distance to the touch sensitive display screen and disabling the detection of manual touch input when the stylus is within the predetermined distance to the touch sensitive display screen;

whereby input resulting from inadvertent manual contact with the touch sensitive display screen will not interfere with input from the stylus.

11. A paperless parcel tracking system which obtains signature and data information without paper records, comprising:

a processor for executing a parcel tracking program;

storage for storing signature information and parcel descriptive information;

a bar code reader for reading parcel descriptive information from a bar code related to at least one selected parcel into the storage under control of the processor;

a stylus for entering information into the system;

a touch sensitive tablet display for detecting signature information written by the stylus on the tablet display which signature information is related to the selected parcel descriptive information and store the signature information into the storage;

means to display control information in predetermined fields of the tablet display;

means to detect input from manual contact with the tablet display;

means to disable input from manual contact with the tablet display when the stylus is within a predetermined distance to the tablet display; and host link means to output the selected parcel descriptive information and related signature information;

whereby signatures related to the tracking of parcels are obtained without paper documentation.

12. A system, as in claim 11, wherein the host link means is an infrared link.

13. A system, as in claim 11, wherein the host link means is a cellular modem.

* * * * *